US012750112B2

(12) United States Patent
Wu et al.

(10) Patent No.: US 12,750,112 B2
(45) Date of Patent: Sep. 29, 2026

(54) TIME DOMAIN BASIS REPORTING FOR CHANNEL STATE INFORMATION

(71) Applicant: QUALCOMM Incorporated, San Diego, CA (US)

(72) Inventors: Liangming Wu, Beijing (CN); Wei Xi, Beijing (CN); Chenxi Hao, Beijing (CN); Min Huang, Beijing (CN); Jing Dai, Beijing (CN); Chao Wei, Beijing (CN); Rui Hu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 18/712,969

(22) PCT Filed: Feb. 1, 2022

(86) PCT No.: PCT/CN2022/075301
§ 371 (c)(1),
(2) Date: May 23, 2024

(87) PCT Pub. No.: WO2023/147681
PCT Pub. Date: Aug. 10, 2023

(65) Prior Publication Data

US 2025/0023610 A1 Jan. 16, 2025

(51) Int. Cl.
*H04B 7/06* (2006.01)
*H04B 7/0456* (2017.01)
(Continued)

(52) U.S. Cl.
CPC ......... *H04B 7/0626* (2013.01); *H04B 7/0456* (2013.01); *H04L 25/021* (2013.01); *H04W 72/0446* (2013.01)

(58) Field of Classification Search
CPC .. H04B 7/0626; H04B 7/0456; H04B 7/0639; H04B 7/048; H04L 25/021; H04L 25/0224; H04W 72/0446
See application file for complete search history.

(56) References Cited

U.S. PATENT DOCUMENTS

2019/0058560 A1 2/2019 Chen et al.
2021/0126692 A1 * 4/2021 Chung ................. H04B 7/0626
(Continued)

FOREIGN PATENT DOCUMENTS

WO 2020192790 A1 10/2020

OTHER PUBLICATIONS

International Search Report and Written Opinion—PCT/CN2022/075301—ISA/EPO—Nov. 7, 2022.

*Primary Examiner* — Ricky Q Ngo
*Assistant Examiner* — Kabir U Jahangir
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information that specifies one or more parameters associated with generating, by the UE, a time domain covariance matrix specific to the UE. The UE may receive a channel state information (CSI) reference signal (CSI-RS). The UE may transmit, based at least in part on the CSI-RS and the one or more parameters, a CSI report, the CSI report including data representing the time domain covariance matrix. Numerous other aspects are described.

30 Claims, 11 Drawing Sheets

(51) Int. Cl.
*H04L 25/02* (2006.01)
*H04W 72/0446* (2023.01)

(56) References Cited

U.S. PATENT DOCUMENTS

| | | | | |
|---|---|---|---|---|
| 2021/0234587 | A1 | 7/2021 | Wu et al. | |
| 2021/0250069 | A1 | 8/2021 | Yu et al. | |
| 2022/0329297 | A1* | 10/2022 | Lee | H04B 7/0626 |
| 2023/0056263 | A1* | 2/2023 | Kim | H04B 7/0456 |

* cited by examiner

TIME DOMAIN BASIS REPORTING FOR CHANNEL STATE INFORMATION

CROSS-REFERENCE TO RELATED APPLICATION

This application is a 371 national stage application of PCT Application No. PCT/CN2022/075301 filed on Feb. 1, 2022, entitled "TIME DOMAIN BASIS REPORTING FOR CHANNEL STATE INFORMATION," which is hereby expressly incorporated by reference herein.

FIELD OF THE DISCLOSURE

Aspects of the present disclosure generally relate to wireless communication and to techniques and apparatuses for time domain basis reporting for channel state information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving configuration information that specifies one or more parameters associated with generating, by the UE, a time domain covariance matrix specific to the UE. The method may include receiving a channel state information (CSI) reference signal (CSI-RS). The method may include transmitting, based at least in part on the CSI-RS and the one or more parameters, a CSI report, the CSI report including data representing the time domain covariance matrix.

Some aspects described herein relate to a method of wireless communication performed by a base station. The method may include transmitting configuration information that specifies one or more parameters associated with generating, by the UE, a time domain covariance matrix specific to the UE. The method may include transmitting a CSI-RS. The method may include receiving and based at least in part on the CSI-RS and the one or more parameters, a CSI report, the CSI report including data representing the time domain covariance matrix.

Some aspects described herein relate to a UE for wireless communication. The user equipment may include a memory and one or more processors coupled to the memory. The one or more processors may be configured to receive configuration information that specifies one or more parameters associated with generating, by the UE, a time domain covariance matrix specific to the UE. The one or more processors may be configured to receive a CSI-RS. The one or more processors may be configured to transmit, based at least in part on the CSI-RS and the one or more parameters, a CSI report.

Some aspects described herein relate to a base station for wireless communication. The base station may include a memory and one or more processors coupled to the memory. The one or more processors may be configured to transmit configuration information that specifies one or more parameters associated with generating, by the UE, a time domain covariance matrix specific to the UE. The one or more processors may be configured to transmit a CSI-RS. The one or more processors may be configured to receive, based at least in part on the CSI-RS and the one or more parameters, a CSI report.

Some aspects described herein relate to a non-transitory computer-readable medium that stores a set of instructions for wireless communication by a UE. The set of instructions, when executed by one or more processors of the UE, may cause the UE to receive configuration information that specifies one or more parameters associated with generating, by the UE, a time domain covariance matrix specific to the UE. The set of instructions, when executed by one or more processors of the UE, may cause the UE to receive a CSI-RS. The set of instructions, when executed by one or more processors of the UE, may cause the UE to transmit, based at least in part on the CSI-RS and the one or more parameters, a CSI report.

Some aspects described herein relate to a non-transitory computer-readable medium that stores a set of instructions for wireless communication by a base station. The set of instructions, when executed by one or more processors of the base station, may cause the base station to transmit configuration information that specifies one or more parameters associated with generating, by the UE, a time domain covariance matrix specific to the UE. The set of instructions, when executed by one or more processors of the base station, may cause the base station to transmit a CSI-RS. The set of instructions, when executed by one or more processors of the base station, may cause the base station to receive, based at least in part on the CSI-RS and the one or more parameters, a CSI report.

Some aspects described herein relate to an apparatus for wireless communication. The apparatus may include means for receiving configuration information that specifies one or more parameters associated with generating, by the apparatus, a time domain covariance matrix specific to the apparatus. The apparatus may include means for receiving a CSI-RS. The apparatus may include means for transmitting, based at least in part on the CSI-RS and the one or more parameters, a CSI report, the CSI report including data representing the time domain covariance matrix.

Some aspects described herein relate to an apparatus for wireless communication. The apparatus may include means for transmitting configuration information that specifies one or more parameters associated with generating, by the UE, a time domain covariance matrix specific to the UE. The apparatus may include means for transmitting a CSI-RS. The apparatus may include means for receiving, based at least in part on the CSI-RS and the one or more parameters, a CSI report, the CSI report including data representing the time domain covariance matrix.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices) Aspects may be implemented in chip-level components, modular components, non-modular components, non-chip-level components, device-level components, and/or system-level components Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
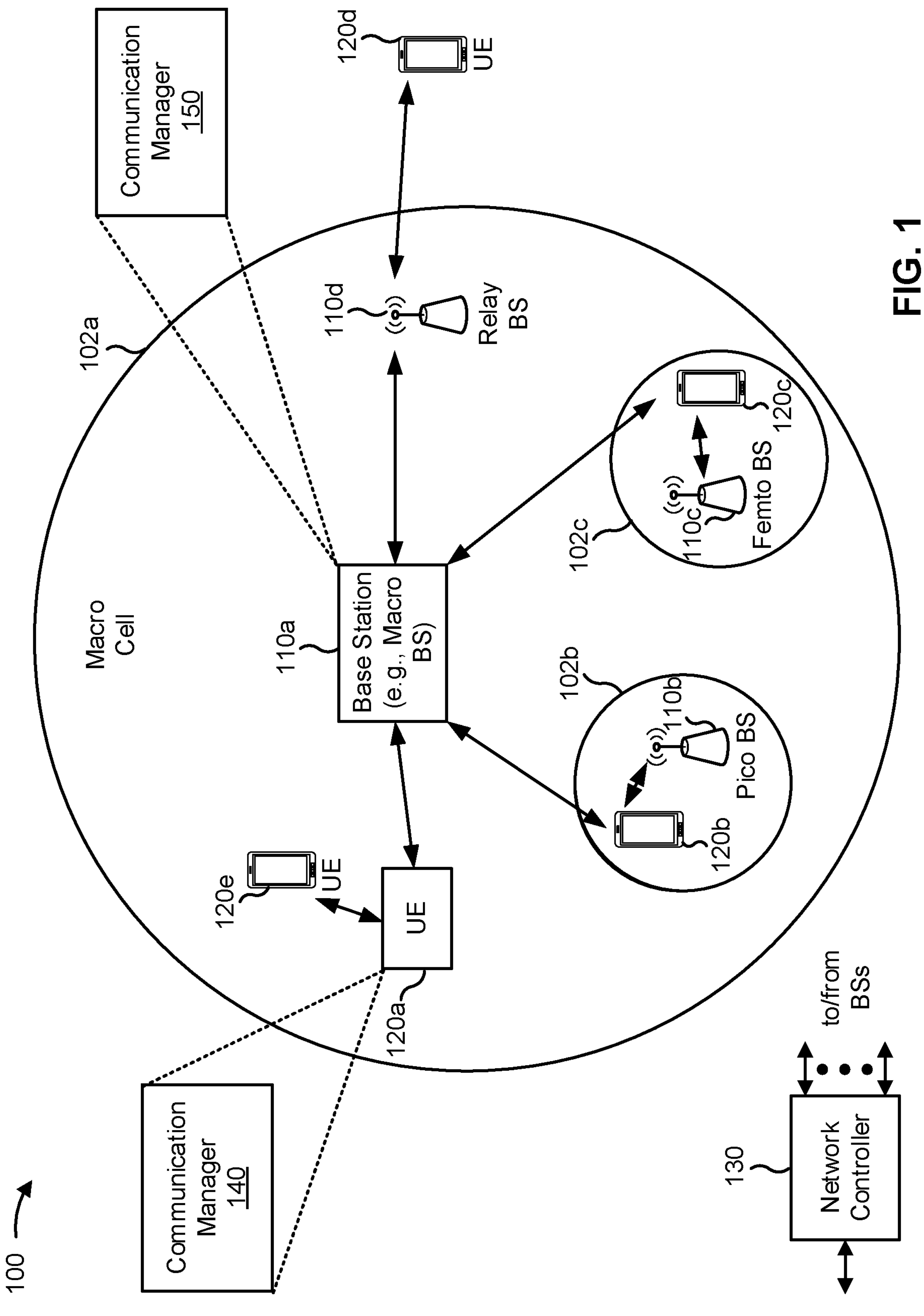
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP) Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz) Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive (e.g., from a base station) configuration information that specifies one or more parameters associated with generating, by the UE, a time domain covariance matrix specific to the UE; receive (e.g., from the base station) a CSI-RS; and transmit (e.g., to the base station), based at least in part on the CSI-RS and the one or more parameters, a CSI report, the CSI report including data representing the time domain covariance matrix. Additionally, or alternatively, the communication manager 140 may perform one or more other operations described herein.

In some aspects, the base station 110 may include a communication manager 150. As described in more detail elsewhere herein, the communication manager 150 may transmit (e.g., to a UE) configuration information that specifies one or more parameters associated with generating, by the UE, a time domain covariance matrix specific to the UE; transmit (e.g., to the UE) a CSI-RS, and receive (e.g., from the UE), based at least in part on the CSI-RS and the one or more parameters, a CSI report, the CSI report including data representing the time domain covariance matrix. Additionally, or alternatively, the communication manager 150 may perform one or more other operations described herein.

As indicated above, FIG. 1 is provided as an example. Other examples may differ from what is described with regard to FIG. 1.

Figure 2:
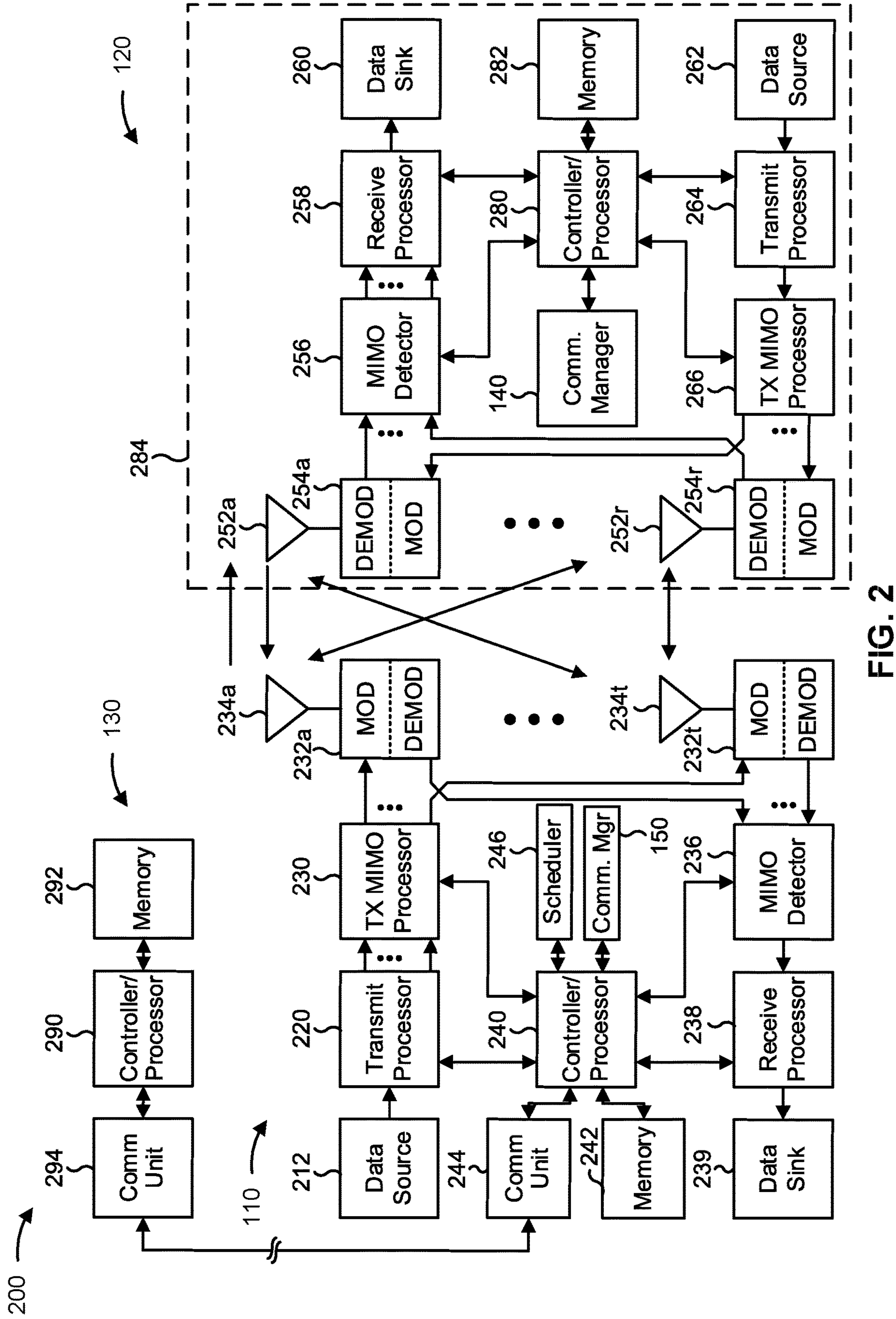
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the base station 110, the controller/processor 280 of the UE 120, and/or any other component(s) of FIG. 2 may perform one or more techniques associated with time domain basis reporting for channel state information, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for receiving configuration information that specifies one or more parameters associated with generating, by the UE, a time domain covariance matrix specific to the UE; means for receiving a CSI-RS; and/or means for transmitting, based at least in part on the CSI-RS and the one or more parameters, a CSI report, the CSI report including data representing the time domain covariance matrix. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting configuration information that specifies one or more parameters associated with generating, by the UE, a time domain covariance matrix specific to the UE; means for transmitting a CSI-RS; and/or means for receiving, based at least in part on the CSI-RS and the one or more parameters, a CSI report, the CSI report including data representing the time domain covariance matrix. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
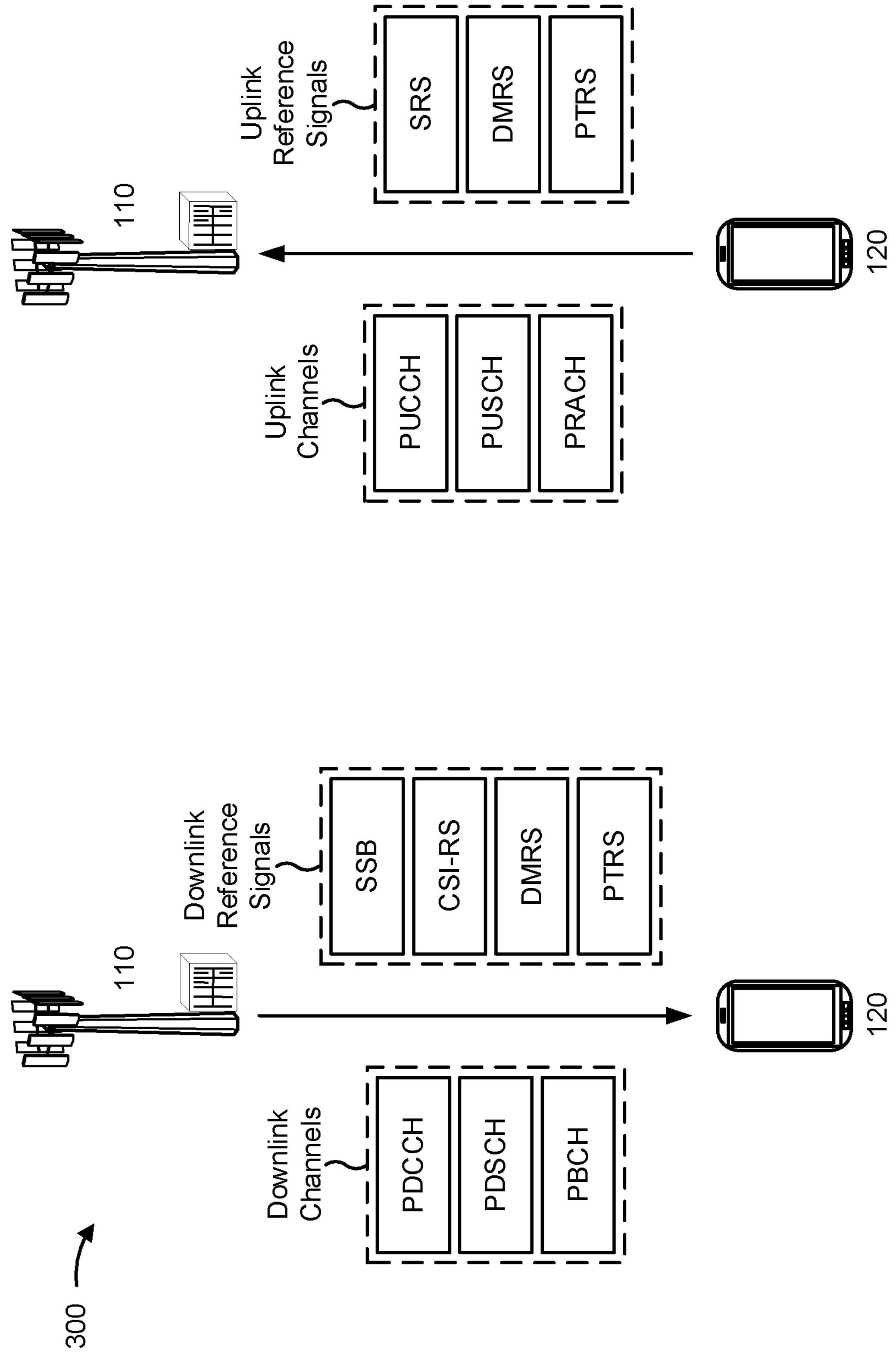
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

During operation, wireless channel conditions between the base station 110 and the UE 120 may vary based on a number of factors, such as distance between transmitter and receiver, interfering signals, or obstructions, among other examples. As described herein, the UE 120 may use the CSI-RSs transmitted by the base station 110 to estimate the wireless channel conditions and transmit the estimate to the base station 110 in CSI-RS reports. The base station 110 may then use the CSI-RS reports to determine various transmission parameters for communications between the base station 110 and the UE 120.

In some situations, the reported CSI may be outdated, for example, due to processing time at the UE 120 or the base station 110, or rapidly changing channel conditions, such as movement of the UE 120 relative to the base station 110, among other examples. In this situation, the transmission parameters selected by the base station 110 may be based on outdated information, which may lead to decreased communications quality, among other issues. While an increase in the frequency of CSI-RS transmission and CSI reporting may help alleviate some of the issues, this may increase overhead for the communications. For example, increasing CSI signaling and reporting increases signaling overhead in the wireless channel(s) and may also increase processing overhead at both the UE 120 and the base station 110, as they respectively generate and process CSI reports.

One approach to address the potential overhead introduced by increased CSI report is to use CSI compression. In some situations, the UE 120 and base station 110 may use spatial, frequency, and/or time domain CSI compression to reduce overhead. For example, the UE 120 may perform a linear combination of CSI on a spatial, frequency, and time domain basis to compress CSI, and the base station 110 may extrapolate the CSI from the compressed CSI.

By way of example, for a given time instance n, the precoder for a layer on $N_3$ sub-bands may be illustrated by equation 1

$$W = W_1 \times \tilde{W}_2 \times W_f^H = \begin{pmatrix} \sum_{i=0}^{L-1} \sum_{m=0}^{M-1} v_{m_1^{(i)}, m_2^{(i)}} c_{i,m} \cdot f_{m_3^{(m)}}^H \\ \sum_{l=0}^{L-1} \sum_{m=0}^{M-1} v_{m_1^{(i)}, m_2^{(i)}} c_{i+L,m} \cdot f_{m_3^{(m)}}^H \end{pmatrix} \quad \text{(Equation 1)}$$

In equation 1, $c_{i,m,l}$ is the combination coefficient for the i-th spatial basis (beam), m-th frequency basis; $\tilde{W}_2$ is the 2L×M matrix containing all coefficients;

$$v_{m_1^{(i)}, m_2^{(i)}}$$

is a $N_t$×1 SD basis; $W_1$ is a $N_t$×2L matrix containing all spatial domain (SD) bases;

$$f_{m_3^{(m)}}^H$$

is a 1×$N_3$ frequency domain (FD) basis;

$$W_f^H$$

is a M×$N_3$ matrix containing all FD bases; and time instance index n is omitted for brevity, as the CSI report is independent per CSI occasion. The UE 120 and the base station 110 may linearly combine a set of spatial-domain bases and a set of frequency-domain bases (e.g., according to Equation 1) in order to configure precoding for at least one layer of the UE 120 or the base station 110.

In some aspects, the UE 120 may also apply time-domain compression to the linear combination coefficients for the precoder before transmission to the base station 110. The time-domain compression of the linear combination coefficients by the UE 120 may be based at least in part on the number of CSI-RSs. For each time instance of the CSI-RSs, the UE 120 may determine a set of linear combination coefficients, each associated with a respective spatial-domain basis of the spatial-domain bases $W_1$ and associated with a respective frequency-domain basis of the frequency-domain bases $W_f$. For example, the UE 120 may determine $\tilde{W}_2(0)$, $\tilde{W}_2(1)$, . . . , $\tilde{W}_2(N-1)$ and apply time-domain compression for each corresponding linear combination coefficient across $\tilde{W}_2(0)$, $\tilde{W}_2(1)$ . . . , $\tilde{W}_2(N-1)$ based on a time-domain basis d(n). To do so, the UE 120 may model each entry in $\tilde{W}_2$ as a band-limited process, as shown in Equation 2.

$$c_{i,m}(n)=\tilde{c}_{i,m}(n)=\sum_{\tau=0}^{D-1} d_{\tau}(n)\cdot\gamma_{\tau,i,m} \quad \text{(Equation 2)}$$

Where $d_{\tau}(n)$ is the time domain (TD) basis; $\gamma_{\tau,i,m}$ is the combination coefficient for the t-th time basis, i-th spatial basis (e.g., beam), and m-th frequency basis. The UE 120 may measure and report (e.g., in a CSI report) $\gamma_{k,i,m}$ based on N bundled CSI-RS occurrences. In other words, the UE 120 may transmit a single CSI report for multiple CSI-RSs. In some aspects, the UE 120 may transmit additional information, included in or separate from the CSI report, such as information indicating $W_1$ and $W_f$. In some aspects, the $W_1$ and $W_f$ matrices may be assumed invariant across the N bundled CSI-RS occasions.

The base station 110 may use the information included in the CSI report to calculate precoder values (e.g., using Equation 1 and/or Equation 2). The base station 110 may then determine a transmission configuration, based at least in part on the CSI report, to account for the channel conditions.

Accordingly, CSI compression may address potential issues in CSI reporting, such as communication and processing overhead introduced due to CSI reporting frequency. However, as different UEs may experience different channel conditions, including different speeds and angular spread, this may impact the time domain basis. For example, different UEs, and different beams on the same UE, may experience different Doppler spectrum. CSI compression may not account for the differences on a UE and/or per beam basis, which may impact the accuracy of the CSI being reported.

As indicated above, FIG. 3 is provided as an example. Other examples may differ from what is described with regard to FIG. 3.

Some techniques and apparatuses described herein enable UEs and base stations to perform CSI compression using a TD basis that is specific to a UE and/or one or more beams of the UE. For example, a UE may receive, from a base station, configuration information that specifies one or more parameters associated with generating a TD covariance matrix that is specific to the UE. Using one or more CSI-RSs received from the base station, and the one more parameters, the UE may transmit data indicating the TD covariance matrix to the base station. The transmitted data may be included in, or separate from, other CSI. The base station may then use the received data to extrapolate the TD covariance matrix for use in configuring transmission parameters for future communications with the UE. In this way, CSI may be reported using TD compression with UE and/or beam specific TD bases. This enables the UE and base station to account for differences in channel conditions when performing CSI compression. As a result, the different TD bases may enable more efficient and/or more accurate CSI reporting, which may lead to increased communications quality.

Figure 4:
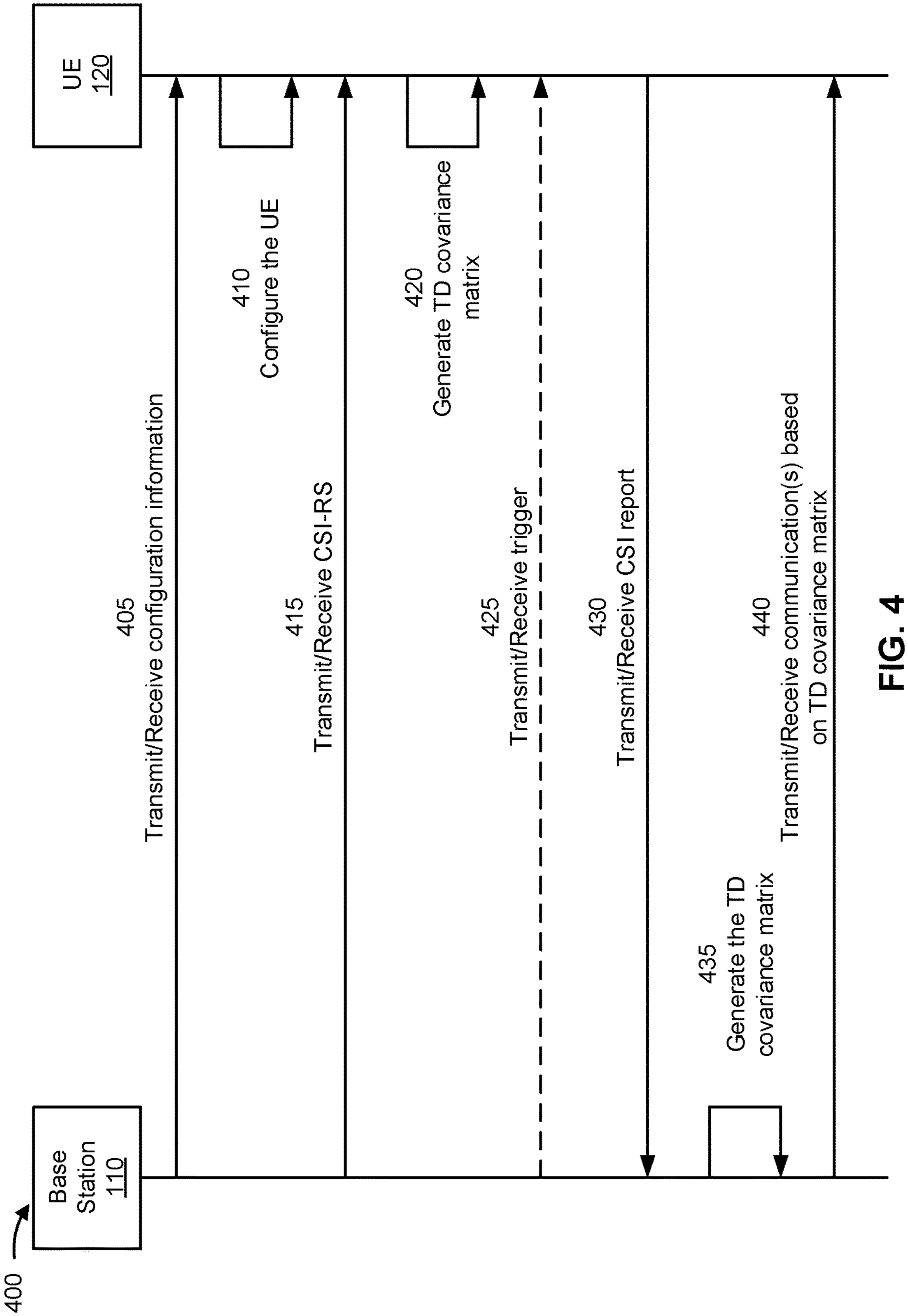
FIG. 4 is a diagram illustrating an example associated with time domain basis reporting for channel state information, in accordance with the present disclosure.

FIG. 4 is a diagram illustrating an example 400 associated with time domain basis reporting for channel state information, in accordance with the present disclosure. As shown in FIG. 4, a UE (e.g., UE 120) may communicate (e.g., transmit an uplink transmission and/or receive a downlink transmission) with a base station (e.g., base station 110). The UE and the base station may be part of a wireless network (e.g., wireless network 100).

As shown by reference number 405, the base station may transmit, and the UE may receive, configuration information. In some aspects, the UE may receive configuration information from another device (e.g., from another base station or another UE). In some aspects, the UE may receive the configuration information via radio resource control (RRC) signaling and/or medium access control (MAC) signaling (e.g., MAC control elements (MAC CEs)). In some aspects, the configuration information may include an indication of one or more configuration parameters (e.g., already known to the UE) for selection by the UE and/or explicit configuration information for the UE to use to configure the UE.

In some aspects, the configuration information may indicate that the UE is to generate a TD covariance matrix specific to the UE for CSI reporting. For example, the UE may be configured to receive a CSI-RS from a base station, generate a TD covariance matrix based at least in part on one or more parameters specified by the configuration information (or other configuration information), and transmit data representing the TD covariance matrix to the base station in a CSI report. In some aspects, the configuration information may indicate that the base station may transmit a CSI-RS to the UE, receive the data representing the TD covariance matrix from the UE, and use the TD covariance matrix for transmitting communications to the UE using resources that are based at least in part on the TD covariance matrix.

In some aspects, the configuration information may specify one or more parameters associated with the UE generating a TD covariance matrix. For example, the one or more parameters may include one or more of: a matrix quantity parameter, a matrix size parameter, a sampling density parameter, or a sampling domain parameter. The matrix quantity parameter may indicate whether the matrix should indicate one or more of: CQI, CRI, PMI, LI, RI, and/or RSRP. In some aspects, the matrix quantity parameter for the TD covariance matrix may be activated independently from, or together with, a PMI quantity for a PMI. The matrix size parameter may indicate a size of the TD covariance matrix. For example, a matrix size parameter of 4 may indicate a 4×4 matrix, 8 may indicate an 8×8 matrix, and 16 may indicate a 16×16 matrix. The sampling density parameter may indicate whether the sampling density is slot-level based (e.g., not related to the CSI-RS configuration), or whether the sampling density is associated with the CSI-RS configuration. For example, using slot-level based sampling density, a value $n_s$=1 or 2 may indicate a 1 or 2-slot level sampling of the TD covariance matrix. As another example, using sampling density associated with CSI-RS configuration, a value $n_s$=1 or 2 may indicate a sampling rate of the TD covariance matrix is $T_p$ or $2T_p$, where $T_p$ is the periodicity of non-zero power CSI-RS. The sampling domain parameter may indicate that the TD covariance matrix should be port specific (e.g., beam specific), port-group specific (e.g., beam group specific), or resource specific (e.g., specific to a CSI-RS resource).

In some aspects, the configuration information indicates an initial slot for measuring the CSI-RS and a CSI reporting window for transmission of the CSI report. The initial slot may be a slot offset to trigger the CSI report or a slot offset to the CSI report. In some aspects, the configuration information indicates an initial slot for measuring the CSI-RS and a CSI reporting window for transmission of another CSI report. The other CSI report may be for a PMI. In other words, different CSI-RS resources may be used for TD covariance matrix calculation and PMI calculation. In some aspects, a new non-zero power CSI-RS may be introduced in the CSI configuration for the TD covariance matrix. In this situation, the number of ports can be smaller than the non-zero power CSI-RS for PMI calculation. For example, a 2 port periodic CSI-RS resource may be configured for the TD covariance matrix while a 16 port aperiodic CSI-RS resource is configured for PMI calculation.

As shown by reference number 410, the UE may configure the UE for communicating with the base station. In some aspects, the UE may configure the UE based at least in part on the configuration information. In some aspects, the UE may be configured to perform one or more operations described herein.

As shown by reference number 415, the base station may transmit, and the UE may receive, a CSI-RS (e.g., CSI-RS for channel measurement and/or CSI-RS for tracking). CSI-RS may be transmitted, as described herein, to enable the UE to determine channel conditions and report the conditions to the base station for use in future communications with the UE. In some aspects, a CSI-RS may also be a CSI-RS for tracking, such as a periodic or aperiodic reference signal for time and/or frequency tracking. For example, after configuring CSI reporting, the base station may periodically, or aperiodically, send one or more CSI-RSs. The CSI-RSs may be for TD covariance matrix calculation, for PMI, for tracking (e.g., a tracking-RS), or a combination thereof. For example, the base station may transmit, and the UE may receive multiple CSI-RSs. Based at least in part on one of the CSI-RSs, the UE may transmit data indicating a TD covariance matrix, as described herein. Based at least in part on another one of the CSI-RSs, the UE may transmit data indicating a PMI.

As shown by reference number 420, the UE may generate, based at least in part on the one or more parameters and the CSI-RS, a TD covariance matrix. In some aspects, the time domain covariance matrix specifies values associated with communication resources to be used for communications between the UE and the base station. For example, the TD covariance matrix may be associated with one or more CSI-RS ports, one or more spatially precoded (or equivalent) CSI-RS ports, and/or a joint spatial and frequency domain basis. In some aspects, the TD covariance matrix may be generated based at least in part on the one or more parameters indicated by the configuration information. Accordingly, the UE may generate a TD covariance matrix based at least in part on one or more of: the matrix quantity parameter, the matrix size parameter, the sampling density parameter, or the sampling domain parameter, among other examples.

By way of example, the UE may generate a TD covariance matrix by multiplying a frequency domain coefficient matrix into a TD coefficient matrix multiplied by a frequency domain compression matrix. The frequency domain compression matrix may represent the frequencies or sub-bands for which CSI is to be reported, and the size of the frequency domain compression matrix may be based at least in part on a number of TD bases and the number of sub-bands.

The TD coefficient matrix may represent coefficients in a transfer domain, which may be transferred from the frequency domain represented in frequency domain coefficient matrix, such as by applying discrete Fourier transform (DFT), discrete cosine transform (DCT), inverse fast Fourier transform (IFFT), or another transform function to the frequency domain coefficient matrix. The coefficients may include, for example, beam indices and linear combination coefficients for beam combinations based on one or more measurements, such as measurements indicated by the sampling domain parameter. The size of the TD coefficient matrix may be based at least in part on a number of beams for which CSI is to be reported (for example, L beams, with 2 polarizations per beam, for a total of 2L beams) and a number of TD bases M (for example, used when applying the transform function).

As shown by reference number 425, the base station may transmit, and the UE may receive, data triggering a CSI report. For example, the base station may transmit a signal triggering the UE to generate and provide a CSI report indicating the TD covariance matrix. In some aspects, the data triggering the CSI-RS report may be included in another communication. For example, the data triggering the CSI report may be included in the configuration information (or other configuration information). In this situation, a separate signal may not be used as a trigger, but the trigger may be predefined based on the configuration information (e.g., a periodic time-based trigger).

As shown by reference number 430, the UE may transmit, and the base station may receive, a CSI report. The CSI report may include data representing the TD covariance matrix. In some aspects, the data representing the TD covariance matrix comprises a vector associated with a row of the TD covariance matrix. For example, the vector may include, in the first element, a reference amplitude and phase, and other elements of the vector and TD covariance matrix may be quantized over that element. In some aspects, the data representing the TD covariance matrix is based at least in part on an eigenvector decomposition of the TD covariance matrix. For example, the TD covariance matrix may be represented by a vector equation with two solutions as eigenvalues. By transmitting data representing the TD covariance matrix, rather than the matrix itself, less data may be transmitted, leading to less overhead for CSI reporting.

As shown by reference number 435, the base station may generate, from the data representing the TD covariance matrix included in the CSI report, the TD covariance matrix. As described herein, the base station may use the data representing the TD covariance matrix to derive the TD covariance matrix. For example, in some aspects, the base station may perform an element-wise cyclic shift of the data representing the time domain covariance matrix.

In some aspects, the TD covariance matrix may be used to select transmission parameters for downlink communications to the UE, such as a number of transmission layers (e.g., a rank), a precoding matrix (e.g., a precoder), an MCS, or a refined downlink beam, among other examples. For example, the base station may extrapolate a PMI or other transmission parameter from the TD covariance matrix and/or the data representing the TD covariance matrix.

As shown by reference number 440, the base station may transmit, and the UE may receive, one or more communications that are transmitted using transmission parameters that are based at least in part on the TD covariance matrix. For example, the UE and the base station may communicate downlink transmissions using communication parameters determined based on the TD covariance matrix.

As indicated above, FIG. 4 is provided as an example. Other examples may differ from what is described with regard to FIG. 4.

Figure 5:
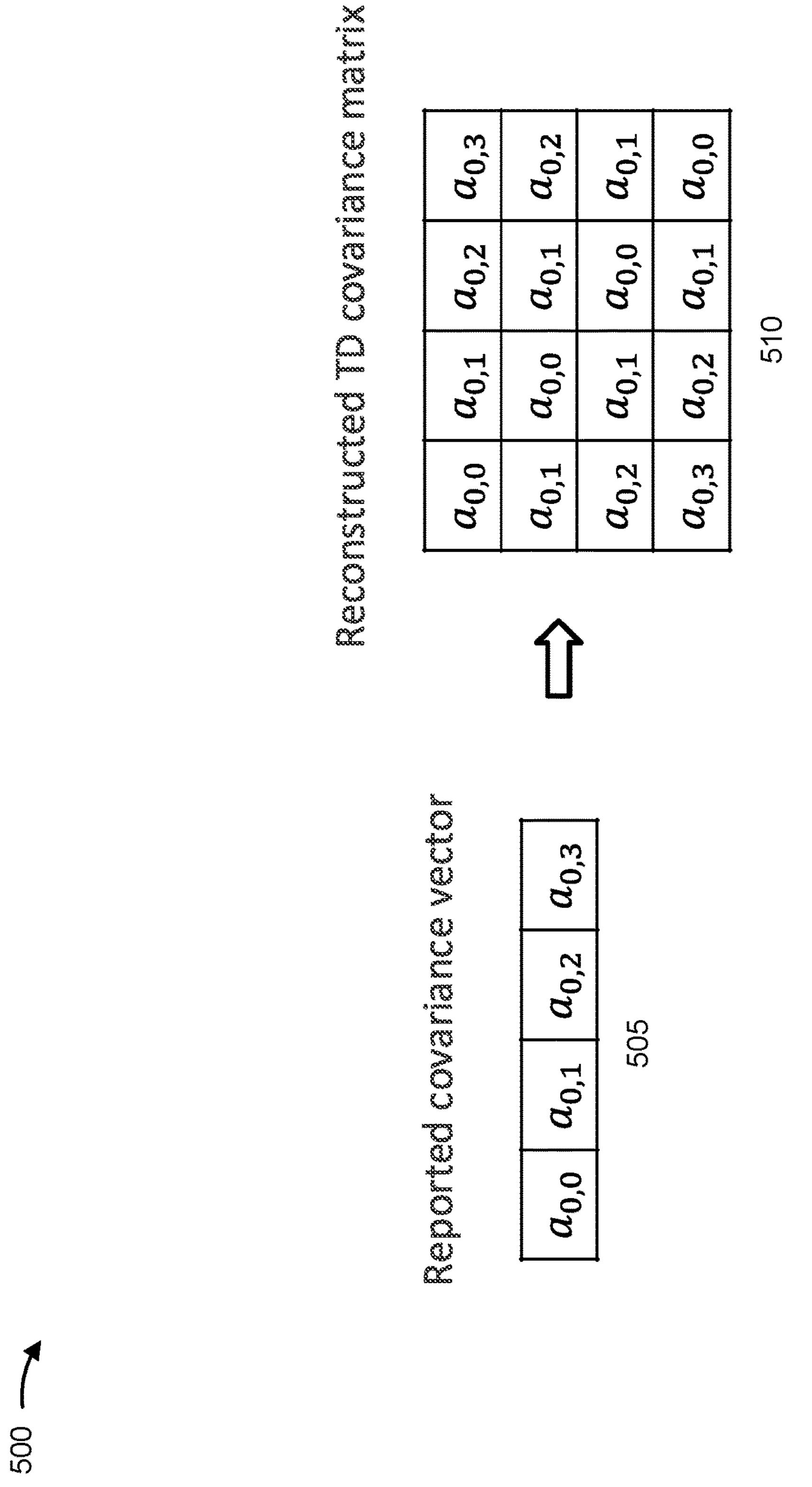
FIG. 5 is a diagram illustrating an example associated with reconstructing a covariance matrix based on a covariance vector, in accordance with the present disclosure.

FIG. 5 is a diagram illustrating an example 500 associated with reconstructing a covariance matrix based on a covariance vector, in accordance with the present disclosure.

As shown in example 500, the reported covariance vector 505 (e.g., data representing the TD covariance matrix) includes 4 elements, the first of which (e.g., $a_{0,0}$) may be associated with a reference amplitude and phase. The base station may take the reported covariance vector and use it to reconstruct the TD covariance matrix 510, as described herein.

As indicated above, FIG. 5 is provided as an example. Other examples may differ from what is described with regard to FIG. 5.

Figure 6:
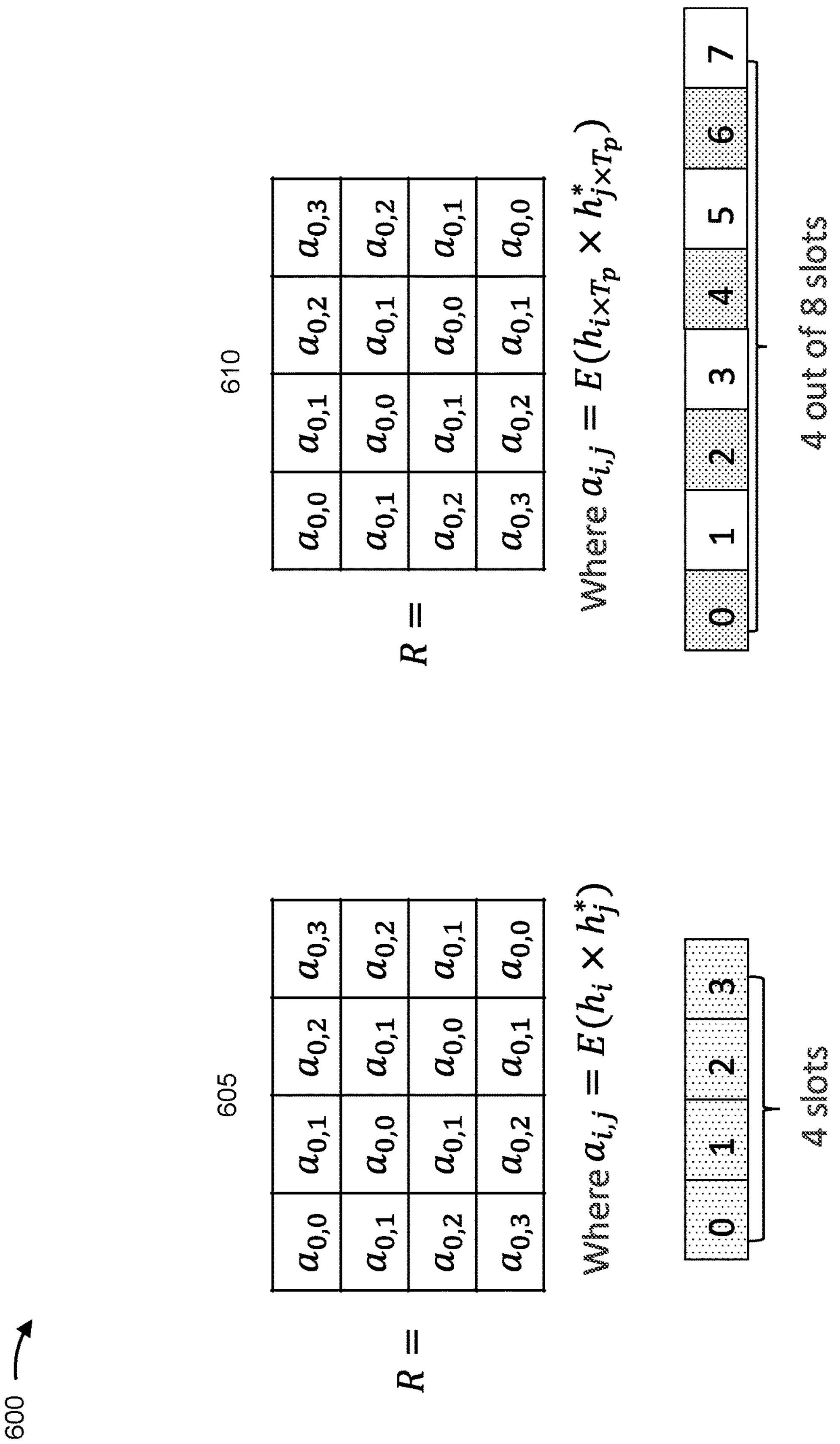
FIG. 6 is a diagram illustrating an example associated with sampling density for reporting channel state information (CSI) with time domain (TD) compression, in accordance with the present disclosure.

FIG. 6 is a diagram illustrating an example 600 associated with sampling density for reporting CSI with TD compression, in accordance with the present disclosure.

As shown in example 605, in a situation where the CSI-RS periodicity is 1 slot, CSI reports may occur in each consecutive slot (e.g., for 4 or more slots, as shown). As shown in example 610, in a situation where the CSI-RS periodicity is 2 slots, CSI reports may occur in alternating slots (e.g., in 4 of 8 slots, as shown).

As indicated above, FIG. 6 is provided as an example. Other examples may differ from what is described with regard to FIG. 6.

Figure 7:
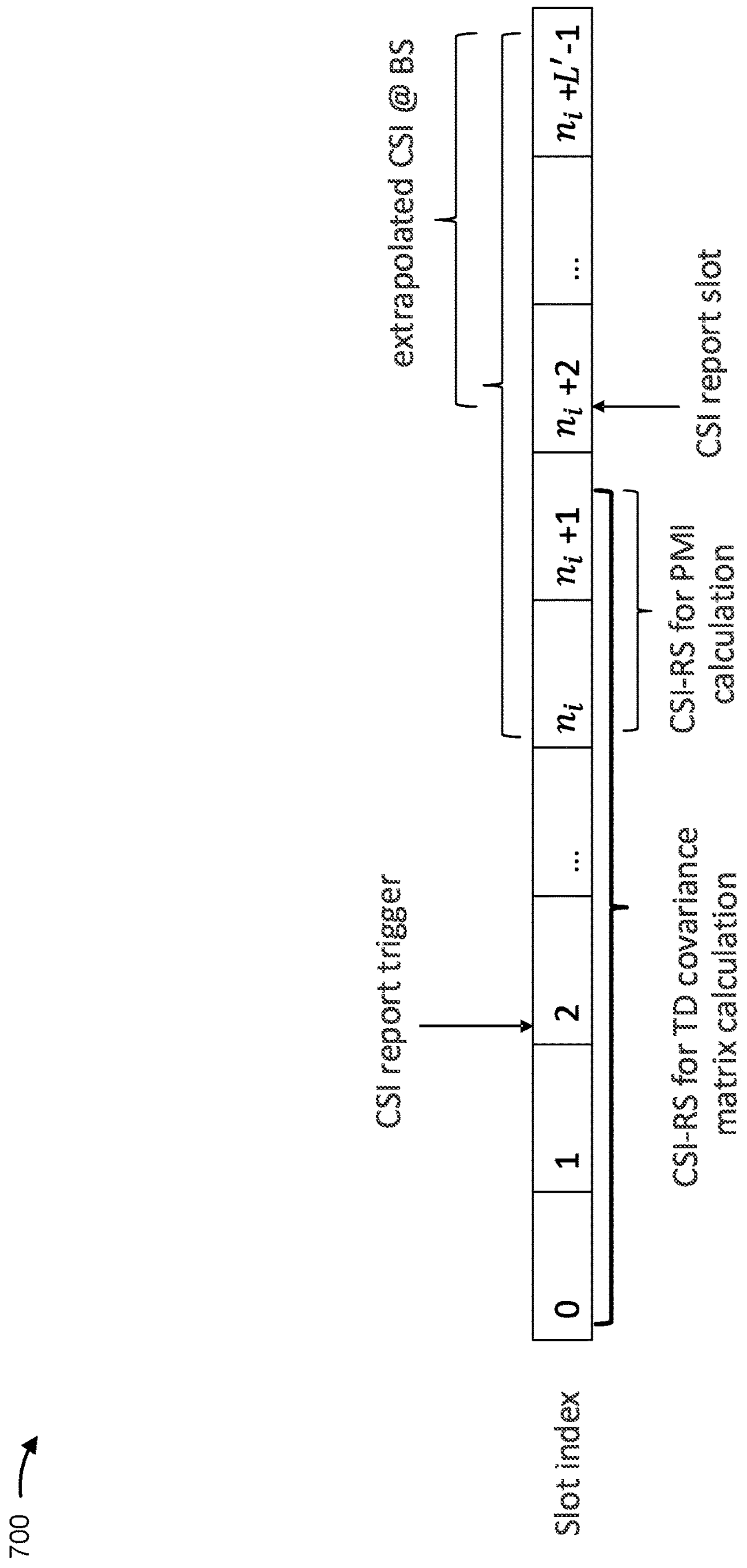
FIG. 7 is a diagram illustrating an example associated with CSI reporting of a TD covariance matrix, in accordance with the present disclosure.

FIG. 7 is a diagram illustrating an example 700 associated with CSI reporting of a TD covariance matrix, in accordance with the present disclosure.

As shown in example 700, the CSI-RSs used for TD covariance matrix calculation may begin before the CSI report is triggered and, in this example, include CSI-RSs that are also used for PMI calculation. When the CSI is reported in slot $n_r+2$, it may include both the data representing the TD covariance matrix and data representing the PMI. The base station may use the reported CSI to extrapolate CSI for later slots from the CSI report, as described herein.

As indicated above, FIG. 7 is provided as an example. Other examples may differ from what is described with regard to FIG. 7.

Figure 8:
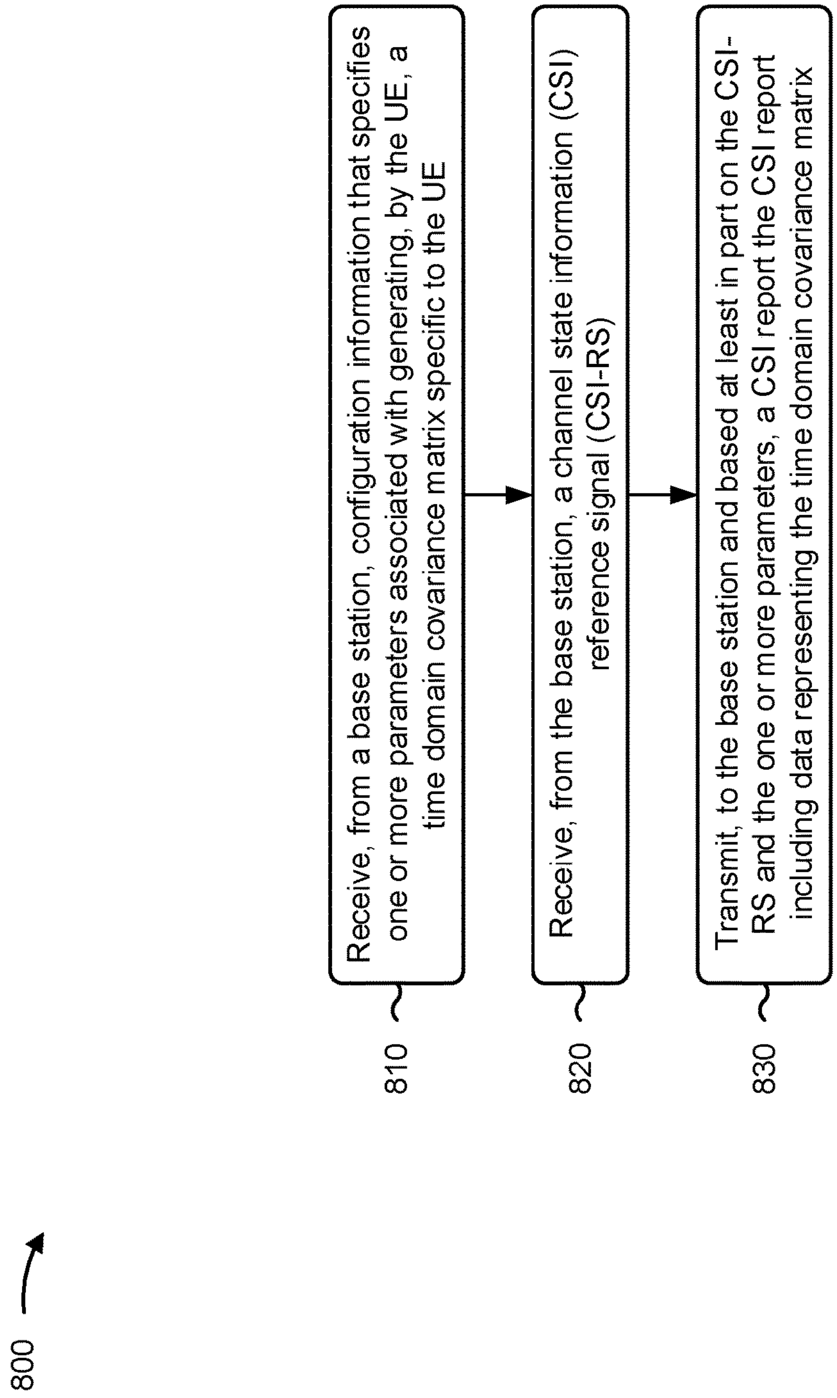
FIGS. 8 and 9 are diagrams illustrating example processes associated with time domain basis reporting for channel state information, in accordance with the present disclosure.

FIG. 8 is a diagram illustrating an example process 800 performed, for example, by a UE, in accordance with the present disclosure. Example process 800 is an example where the UE (e.g., UE 120) performs operations associated with time domain basis reporting for channel state information.

As shown in FIG. 8, in some aspects, process 800 may include receiving configuration information that specifies one or more parameters associated with generating, by the UE, a time domain covariance matrix specific to the UE (block 810). For example, the UE (e.g., using communication manager 140 and/or reception component 1002, depicted in FIG. 10) may receive configuration information that specifies one or more parameters associated with generating, by the UE, a time domain covariance matrix specific to the UE, as described above.

As further shown in FIG. 8, in some aspects, process 800 may include receiving a CSI-RS (block 820). For example, the UE (e.g., using communication manager 140 and/or reception component 1002, depicted in FIG. 10) may receive a CSI-RS, as described above.

As further shown in FIG. 8, in some aspects, process 800 may include transmitting, based at least in part on the CSI-RS and the one or more parameters, a CSI report, the CSI report including data representing the time domain covariance matrix (block 830). For example, the UE (e.g., using communication manager 140 and/or transmission component 1004, depicted in FIG. 10) may transmit, based at least in part on the CSI-RS and the one or more parameters, a CSI report, the CSI report including data representing the time domain covariance matrix, as described above.

Process 800 may include additional aspects, such as any single aspect or any combination of aspects described below and/or in connection with one or more other processes described elsewhere herein.

In a first aspect, process 800 includes generating, based at least in part on the one or more parameters and the CSI-RS, the time domain covariance matrix.

In a second aspect, alone or in combination with the first aspect, the time domain covariance matrix specifies values associated with communication resources to be used for communications between the UE and the base station.

In a third aspect, alone or in combination with one or more of the first and second aspects, the data representing the time domain covariance matrix is based at least in part on an eigenvector decomposition of the time domain covariance matrix.

In a fourth aspect, alone or in combination with one or more of the first through third aspects, the data representing the time domain covariance matrix comprises a vector associated with a first row of the time domain covariance matrix.

In a fifth aspect, alone or in combination with one or more of the first through fourth aspects, the vector includes a reference amplitude value and a reference phase value.

In a sixth aspect, alone or in combination with one or more of the first through fifth aspects, the one or more parameters include one or more of a matrix quantity parameter, a matrix size parameter, a sampling density parameter, or a sampling domain parameter.

In a seventh aspect, alone or in combination with one or more of the first through sixth aspects, process 800 includes receiving another CSI-RS, and transmitting, based at least in part on the other CSI-RS, another CSI report, the other CSI report including data representing a PMI.

In an eighth aspect, alone or in combination with one or more of the first through seventh aspects, process 800 includes configuring, based at least in part on the configuration information, an initial slot for measuring the CSI-RS and a CSI reporting window for transmission of another CSI report, the other CSI report including data representing a PMI.

In a ninth aspect, alone or in combination with one or more of the first through eighth aspects, process 800 includes receiving, after receiving the CSI-RS, data triggering the CSI report.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
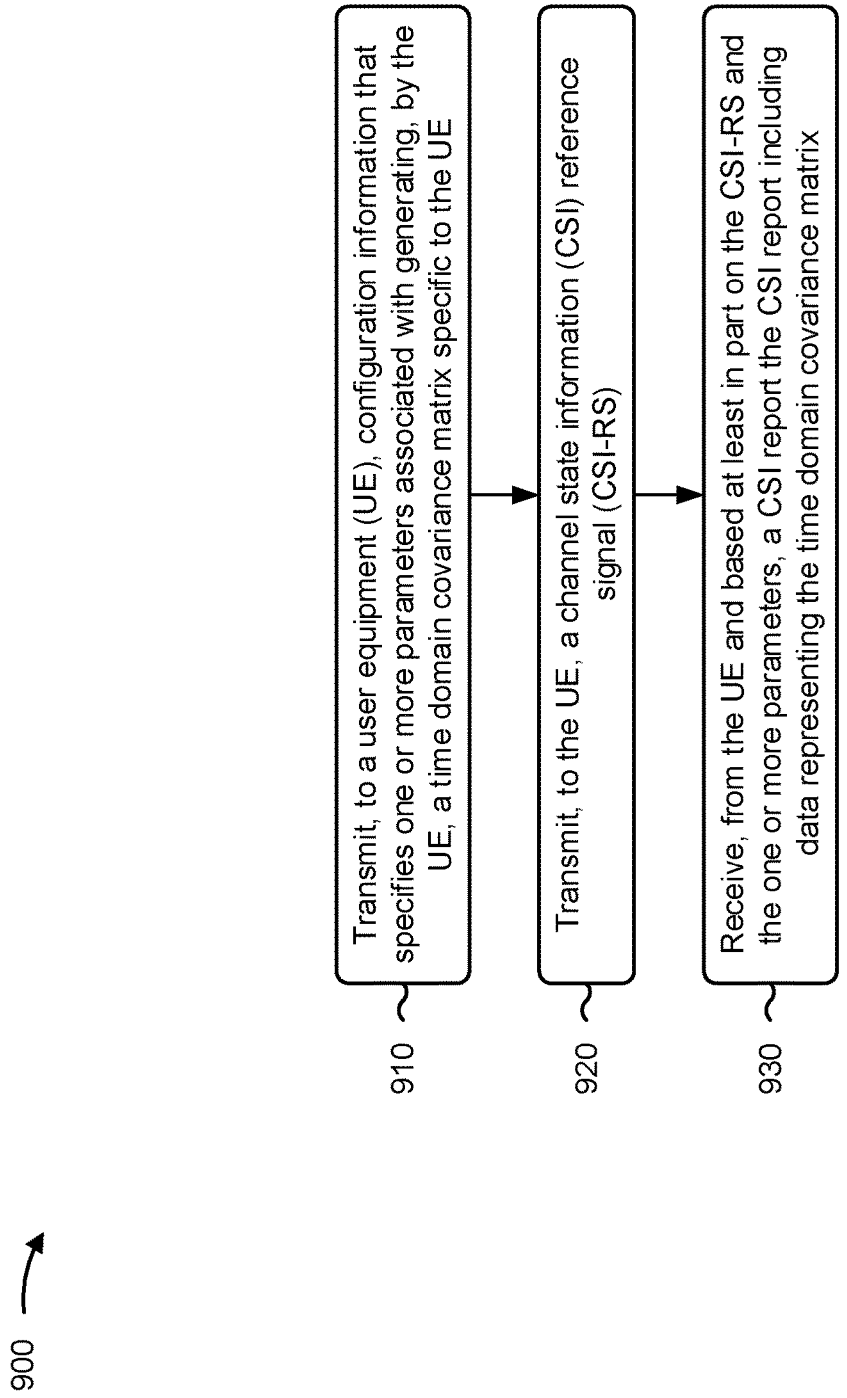

FIG. 9 is a diagram illustrating an example process 900 performed, for example, by a base station, in accordance with the present disclosure Example process 900 is an example where the base station (e.g., base station 110) performs operations associated with time domain basis reporting for channel state information.

As shown in FIG. 9, in some aspects, process 900 may include transmitting configuration information that specifies one or more parameters associated with generating, by the UE, a time domain covariance matrix specific to the UE (block 910). For example, the base station (e.g., using communication manager 150 and/or transmission component 1104, depicted in FIG. 11) may transmit configuration information that specifies one or more parameters associated with generating, by the UE, a time domain covariance matrix specific to the UE, as described above.

As further shown in FIG. 9, in some aspects, process 900 may include transmitting a CSI-RS (block 920). For example, the base station (e.g., using communication manager 150 and/or transmission component 1104, depicted in FIG. 11) may transmit a CSI-RS, as described above.

As further shown in FIG. 9, in some aspects, process 900 may include receiving, based at least in part on the CSI-RS and the one or more parameters, a CSI report, the CSI report including data representing the time domain covariance matrix (block 930). For example, the base station (e.g., using communication manager 150 and/or reception component 1102, depicted in FIG. 11) may receive, based at least in part on the CSI-RS and the one or more parameters, a CSI report, the CSI report including data representing the time domain covariance matrix, as described above.

Process 900 may include additional aspects, such as any single aspect or any combination of aspects described below and/or in connection with one or more other processes described elsewhere herein.

In a first aspect, process 900 includes generating, from the data representing the time domain covariance matrix, the time domain covariance matrix.

In a second aspect, alone or in combination with the first aspect, generating the time domain covariance matrix comprises performing an element-wise cyclic shift of the data representing the time domain covariance matrix.

In a third aspect, alone or in combination with one or more of the first and second aspects, the time domain covariance matrix specifies values associated with communication resources to be used for communications between the UE and the base station.

In a fourth aspect, alone or in combination with one or more of the first through third aspects, the data representing the time domain covariance matrix is based at least in part on an eigenvector decomposition of the time domain covariance matrix.

In a fifth aspect, alone or in combination with one or more of the first through fourth aspects, the data representing the time domain covariance matrix comprises a vector associated with a first row of the time domain covariance matrix.

In a sixth aspect, alone or in combination with one or more of the first through fifth aspects, the vector includes a reference amplitude value and a reference phase value.

In a seventh aspect, alone or in combination with one or more of the first through sixth aspects, the one or more parameters include one or more of a matrix quantity parameter, a matrix size parameter, a sampling density parameter, or a sampling domain parameter.

In an eighth aspect, alone or in combination with one or more of the first through seventh aspects, process 900 includes transmitting another CSI-RS, and receiving, based at least in part on the other CSI-RS, another CSI report, the other CSI report including data representing a PMI.

In a ninth aspect, alone or in combination with one or more of the first through eighth aspects, the configuration information indicates an initial slot for measuring the CSI-RS and a CSI reporting window for transmission of another CSI report, the other CSI report to include data representing a PMI.

In a tenth aspect, alone or in combination with one or more of the first through ninth aspects, process 900 includes transmitting, after transmitting the CSI-RS, data triggering the CSI report.

In an eleventh aspect, alone or in combination with one or more of the first through tenth aspects, process 900 includes transmitting one or more communications using transmission parameters based at least in part on the time domain covariance matrix.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
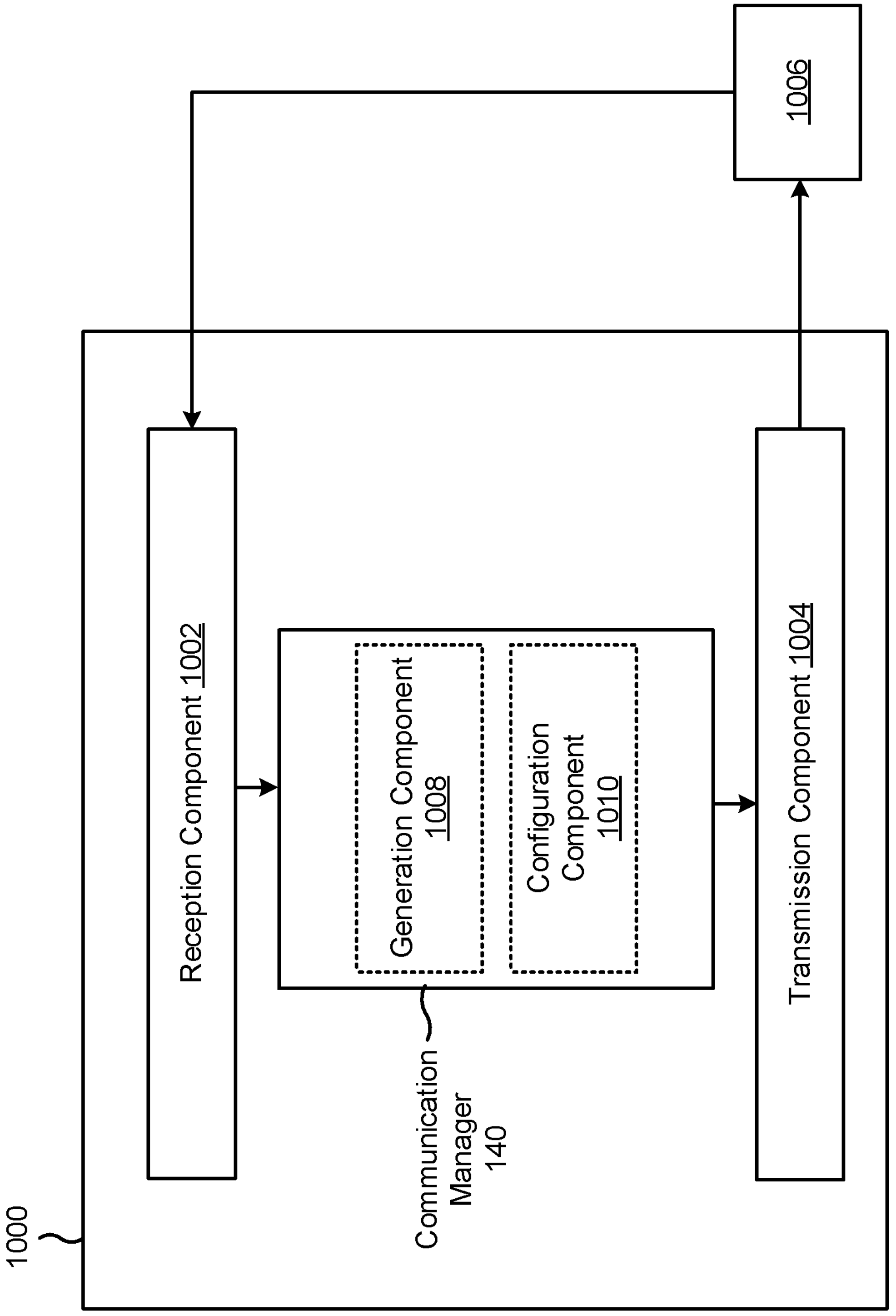
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a generation component 1008, or a configuration component 1010, among other examples.

In some aspects, the apparatus 1000 may be configured to perform one or more operations described herein in connection with FIGS. 3-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive configuration information that specifies one or more parameters associated with generating, by the UE, a time domain covariance matrix specific to the UE. The reception component 1002 may receive a CSI-RS. The transmission component 1004 may transmit, based at least in part on the CSI-RS and the one or more parameters, a CSI report the CSI report including data representing the time domain covariance matrix.

The generation component 1008 may generate, based at least in part on the one or more parameters and the CSI-RS, the time domain covariance matrix.

The reception component 1002 may receive another CSI-RS.

The transmission component 1004 may transmit, based at least in part on the other CSI-RS, another CSI report the other CSI report including data representing a PMI.

The configuration component 1010 may configure, based at least in part on the configuration information, an initial slot for measuring the CSI-RS and a CSI reporting window for transmission of another CSI report the other CSI report including data representing a PMI The reception component 1002 may receive, after receiving the CSI-RS, data triggering the CSI report.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
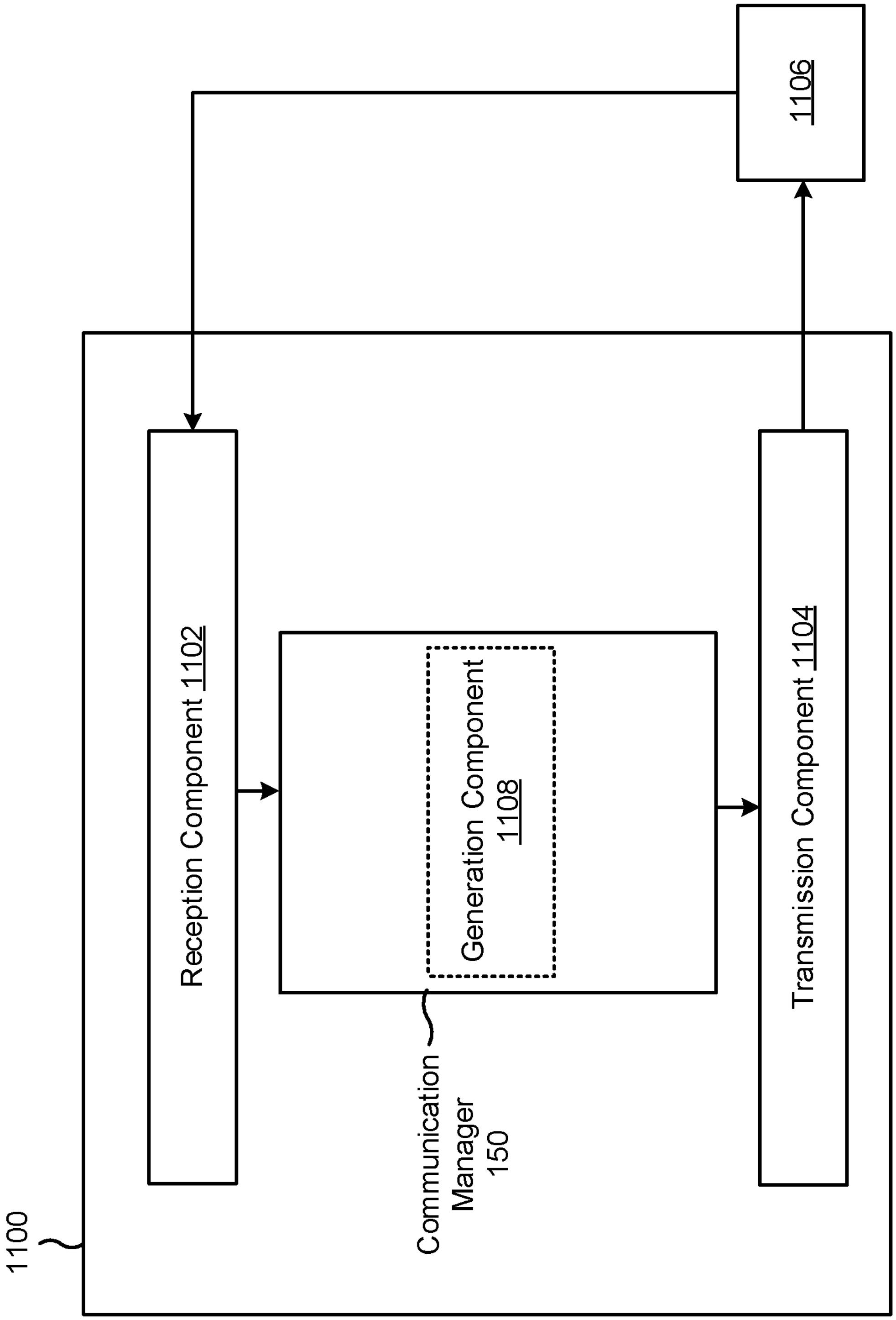

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components) As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a generation component 1108, among other examples.

In some aspects, the apparatus 1100 may be configured to perform one or more operations described herein in connection with FIGS. 3-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit configuration information that specifies one or more parameters associated with generating, by the UE, a time domain covariance matrix specific to the UE. The transmission component 1104 may transmit a CSI-RS. The reception component 1102 may receive, based at least in part on the CSI-RS and the one or more parameters, a CSI report the CSI report including data representing the time domain covariance matrix.

The generation component 1108 may generate, from the data representing the time domain covariance matrix, the time domain covariance matrix.

The transmission component 1104 may transmit another CSI-RS.

The reception component 1102 may receive, based at least in part on the other CSI-RS, another CSI report the other CSI report including data representing a PMI.

The transmission component 1104 may transmit, after transmitting the CSI-RS, data triggering the CSI report.

The transmission component 1104 may transmit one or more communications using transmission parameters based at least in part on the time domain covariance matrix.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: receiving configuration information that specifies one or more parameters associated with generating, by the UE, a time domain covariance matrix specific to the UE; receiving a CSI-RS; and transmitting, based at least in part on the CSI-RS and the one or more parameters, a CSI report, the CSI report including data representing the time domain covariance matrix.

Aspect 2: The method of Aspect 1, further comprising: generating, based at least in part on the one or more parameters and the CSI-RS, the time domain covariance matrix.

Aspect 3: The method of any of Aspects 1-2, wherein the time domain covariance matrix specifies values associated with communication resources to be used for communications between the UE and the base station.

Aspect 4: The method of any of Aspects 1-3, wherein the data representing the time domain covariance matrix is based at least in part on an eigenvector decomposition of the time domain covariance matrix.

Aspect 5: The method of any of Aspects 1-4, wherein the data representing the time domain covariance matrix comprises a vector associated with a first row of the time domain covariance matrix.

Aspect 6: The method of Aspect 5, wherein the vector includes a reference amplitude value and a reference phase value.

Aspect 7: The method of any of Aspects 1-6, wherein the one or more parameters include one or more of: a matrix quantity parameter, a matrix size parameter, a sampling density parameter, or a sampling domain parameter.

Aspect 8: The method of any of Aspects 1-7, further comprising: receiving another CSI-RS; and transmitting, based at least in part on the other CSI-RS, another CSI report, the other CSI report including data representing a PMI.

Aspect 9: The method of any of Aspects 1-8, further comprising: configuring, based at least in part on the configuration information, an initial slot for measuring the CSI-RS and a CSI reporting window for transmission of another CSI report, the other CSI report including data representing a PMI.

Aspect 10: The method of any of Aspects 1-9, further comprising: receiving, after receiving the CSI-RS, data triggering the CSI report.

Aspect 11: A method of wireless communication performed by a base station, comprising: transmitting configuration information that specifies one or more parameters associated with generating, by the UE, a time domain covariance matrix specific to the UE, transmitting a CSI-RS, and receiving, based at least in part on the CSI-RS and the one or more parameters, a CSI report, the CSI report including data representing the time domain covariance matrix.

Aspect 12: The method of Aspect 11, further comprising: generating, from the data representing the time domain covariance matrix, the time domain covariance matrix.

Aspect 13: The method of Aspect 12, wherein generating the time domain covariance matrix comprises: performing an element-wise cyclic shift of the data representing the time domain covariance matrix.

Aspect 14: The method of any of Aspects 11-13, wherein the time domain covariance matrix specifies values associated with communication resources to be used for communications between the UE and the base station.

Aspect 15: The method of any of Aspects 11-14, wherein the data representing the time domain covariance matrix is based at least in part on an eigenvector decomposition of the time domain covariance matrix.

Aspect 16: The method of any of Aspects 11-15, wherein the data representing the time domain covariance matrix comprises a vector associated with a first row of the time domain covariance matrix.

Aspect 17: The method of Aspect 16, wherein the vector includes a reference amplitude value and a reference phase value.

Aspect 18: The method of any of Aspects 11-17, wherein the one or more parameters include one or more of: a matrix quantity parameter, a matrix size parameter, a sampling density parameter, or a sampling domain parameter.

Aspect 19. The method of any of Aspects 11-18, further comprising: transmitting another CSI-RS; and receiving, based at least in part on the other CSI-RS, another CSI report, the other CSI report including data representing a PMI.

Aspect 20: The method of any of Aspects 11-19, wherein the configuration information indicates an initial slot for measuring the CSI-RS and a CSI reporting window for transmission of another CSI report, the other CSI report to include data representing a PMI.

Aspect 21: The method of any of Aspects 11-20, further comprising: transmitting, after transmitting the CSI-RS, data triggering the CSI report.

Aspect 22: The method of any of Aspects 11-21, further comprising: transmitting one or more communications using transmission parameters based at least in part on the time domain covariance matrix.

Aspect 23: An apparatus for wireless communication at a device, comprising a processor; memory coupled with the processor; and instructions stored in the memory and executable by the processor to cause the apparatus to perform the method of one or more of Aspects 1-10.

Aspect 24: An apparatus for wireless communication at a device, comprising a processor; memory coupled with the processor; and instructions stored in the memory and executable by the processor to cause the apparatus to perform the method of one or more of Aspects 11-22.

Aspect 25: A device for wireless communication, comprising a memory and one or more processors coupled to the memory, the one or more processors configured to perform the method of one or more of Aspects 1-10.

Aspect 26: A device for wireless communication, comprising a memory and one or more processors coupled to the memory, the one or more processors configured to perform the method of one or more of Aspects 11-22.

Aspect 27: An apparatus for wireless communication, comprising at least one means for performing the method of one or more of Aspects 1-10.

Aspect 28: An apparatus for wireless communication, comprising at least one means for performing the method of one or more of Aspects 11-22.

Aspect 29: A non-transitory computer-readable medium storing code for wireless communication, the code comprising instructions executable by a processor to perform the method of one or more of Aspects 1-10.

Aspect 30: A non-transitory computer-readable medium storing code for wireless communication, the code comprising instructions executable by a processor to perform the method of one or more of Aspects 11-22.

Aspect 31: A non-transitory computer-readable medium storing a set of instructions for wireless communication, the set of instructions comprising one or more instructions that, when executed by one or more processors of a device, cause the device to perform the method of one or more of Aspects 1-10.

Aspect 32: A non-transitory computer-readable medium storing a set of instructions for wireless communication, the set of instructions comprising one or more instructions that, when executed by one or more processors of a device, cause the device to perform the method of one or more of Aspects 11-22.

The foregoing disclosure provides illustration and description but is not intended to be exhaustive or to limit the aspects to the precise forms disclosed Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive configuration information that specifies one or more parameters associated with generating, by the UE, a time domain covariance matrix specific to the UE;

receive a channel state information (CSI) reference signal (CSI-RS); and transmit, based at least in part on the CSI-RS and the one or more parameters, a CSI report, the CSI report including data representing the time domain covariance matrix.

2. The UE of claim 1, wherein the one or more processors are further configured to:

generate, based at least in part on the one or more parameters and the CSI-RS, the time domain covariance matrix.

3. The UE of claim 1, wherein the time domain covariance matrix specifies values associated with communication resources to be used for communications between the UE and the base station.

4. The UE of claim 1, wherein a time domain basis, associated with the time domain covariance matrix, is based at least in part on an eigenvector decomposition of the time domain covariance matrix.

5. The UE of claim 1, wherein the data representing the time domain covariance matrix comprises a vector associated with a first row of the time domain covariance matrix.

6. The UE of claim 5, wherein the vector includes a reference amplitude value and a reference phase value.

7. The UE of claim 1, wherein the one or more parameters include one or more of:

a matrix quantity parameter, a matrix size parameter, a sampling density parameter, or a sampling domain parameter.

8. The UE of claim 1, wherein the one or more processors are further configured to:

receive another CSI-RS; and transmit, based at least in part on the other CSI-RS, another CSI report, the other CSI report including data representing a precoding matrix indicator (PMI).

9. The UE of claim 1, wherein the one or more processors are further configured to:

configure, based at least in part on the configuration information, an initial slot for measuring the CSI-RS and a CSI reporting window for transmission of another CSI report, the other CSI report including data representing a precoding matrix indicator (PMI).

10. The UE of claim 1, wherein the one or more processors are further configured to:

receive, after receiving the CSI-RS, data triggering the CSI report.

11. A base station for wireless communication, comprising:

a memory; and one or more processors, coupled to the memory, configured to:

transmit configuration information that specifies one or more parameters associated with generating, by the UE, a time domain covariance matrix specific to the UE;

transmit a channel state information (CSI) reference signal (CSI-RS); and receive, based at least in part on the CSI-RS and the one or more parameters, a CSI report, the CSI report including data representing the time domain covariance matrix.

12. The base station of claim 11, wherein the one or more processors are further configured to:

generate, from the data representing the time domain covariance matrix, the time domain covariance matrix.

13. The base station of claim 12, wherein the one or more processors, to generate the time domain covariance matrix, are configured to:

perform an element-wise cyclic shift of the data representing the time domain covariance matrix.

14. The base station of claim 11, wherein the time domain covariance matrix specifies values associated with communication resources to be used for communications between the UE and the base station.

15. The base station of claim 11, wherein a time domain basis, associated with the time domain covariance matrix, is based at least in part on an eigenvector decomposition of the time domain covariance matrix.

16. The base station of claim 11, wherein the data representing the time domain covariance matrix comprises a vector associated with a first row of the time domain covariance matrix.

17. The base station of claim 16, wherein the vector includes a reference amplitude value and a reference phase value.

18. The base station of claim 11, wherein the one or more parameters include one or more of:

a matrix quantity parameter, a matrix size parameter, a sampling density parameter, or a sampling domain parameter.

19. The base station of claim 11, wherein the one or more processors are further configured to:

transmit another CSI-RS; and receive, based at least in part on the other CSI-RS, another CSI report, the other CSI report including data representing a precoding matrix indicator (PMI).

20. The base station of claim 11, wherein the configuration information indicates an initial slot for measuring the CSI-RS and a CSI reporting window for transmission of another CSI report, the other CSI report to include data representing a precoding matrix indicator (PMI).

21. The base station of claim 11, wherein the one or more processors are further configured to:

transmit, after transmitting the CSI-RS, data triggering the CSI report.

22. The base station of claim 11, wherein the one or more processors are further configured to:

transmit one or more communications using transmission parameters based at least in part on the time domain covariance matrix.

23. A method of wireless communication performed by a user equipment (UE), comprising:

receiving configuration information that specifies one or more parameters associated with generating, by the UE, a time domain covariance matrix specific to the UE;

receiving a channel state information (CSI) reference signal (CSI-RS); and transmitting, based at least in part on the CSI-RS and the one or more parameters, a CSI report, the CSI report including data representing the time domain covariance matrix.

24. The method of claim 23, further comprising:

generating, based at least in part on the one or more parameters and the CSI-RS, the time domain covariance matrix.

25. The method of claim 23, wherein the data representing the time domain covariance matrix comprises a vector associated with a first row of the time domain covariance matrix.

26. The method of claim 23, wherein the one or more parameters include one or more of:

a matrix quantity parameter, a matrix size parameter, a sampling density parameter, or a sampling domain parameter.

27. A method of wireless communication performed by a base station, comprising:

transmitting, configuration information that specifies one or more parameters associated with generating, by the UE, a time domain covariance matrix specific to the UE;

transmitting a channel state information (CSI) reference signal (CSI-RS); and receiving, based at least in part on the CSI-RS and the one or more parameters, a CSI report, the CSI report including data representing the time domain covariance matrix.

28. The method of claim 27, further comprising:

generating, from the data representing the time domain covariance matrix, the time domain covariance matrix.

29. The method of claim 27, wherein the one or more parameters include one or more of:

a matrix quantity parameter, a matrix size parameter, a sampling density parameter, or a sampling domain parameter.

30. The method of claim 27, further comprising: transmitting, after transmitting the CSI-RS, data triggering the CSI report.

* * * * *